(12) United States Patent
Muench, Jr. et al.

(10) Patent No.: US 6,332,785 B1
(45) Date of Patent: Dec. 25, 2001

(54) HIGH VOLTAGE ELECTRICAL CONNECTOR WITH ACCESS CAVITY AND INSERTS FOR USE THEREWITH

(75) Inventors: Frank J. Muench, Jr., Waukesha; John M. Makal, Menomonee Falls; James A. Wenzel, Sullivan, all of WI (US)

(73) Assignee: Cooper Industries, Inc., Houston, TX (US)

( * ) Notice: Subject to any disclaimer, the term of this patent is extended or adjusted under 35 U.S.C. 154(b) by 0 days.

(21) Appl. No.: 08/886,163

(22) Filed: Jun. 30, 1997

(51) Int. Cl.⁷ .................................................. H01R 4/58
(52) U.S. Cl. ............................................. 439/88; 439/921
(58) Field of Search ................................ 439/88, 89, 921

(56) References Cited

U.S. PATENT DOCUMENTS

| | | | |
|---|---|---|---|
| 1,877,586 | 9/1932 | Rah | 174/11 BH |
| 1,902,617 | 3/1933 | Burr | 174/11 BH |
| 1,988,824 | 1/1935 | Austin | 174/12 BH |
| 1,998,766 | 4/1935 | Mample | 174/11 R |
| 1,999,771 | 4/1935 | Mample | 174/11 R |
| 2,043,227 | 6/1936 | Bennett | 174/11 R |
| 2,071,102 | 2/1937 | Atkinson et al. | 174/11 R |
| 2,189,610 | 2/1940 | Lingal et al. | 174/31 R |
| 2,228,440 | 1/1941 | Chubbuck | 174/12 BH |
| 2,261,742 | 11/1941 | Matsumoto | 174/21 R |
| 2,289,176 | 7/1942 | Burr | 174/12 BH |
| 2,379,942 | 7/1945 | Webber | 439/89 |
| 2,401,595 | 6/1946 | Wetherill | 174/11 R |
| 3,324,449 | 6/1967 | McLoad | 439/201 |
| 3,376,541 | 4/1968 | Link | 439/181 |
| 3,509,516 | 4/1970 | Phillips | 439/921 |
| 3,509,518 | 4/1970 | Phillips | 439/921 |
| 3,513,425 | 5/1970 | Arndt | 439/921 |
| 3,534,323 | 10/1970 | Becker et al. | 439/921 |
| 3,555,487 | 1/1971 | Jones | 439/921 |
| 3,568,136 | 3/1971 | Wells | 439/912 |
| 3,585,568 | 6/1971 | Hervig et al. | 439/88 |
| 3,588,781 | 6/1971 | Williams | 439/190 |
| 3,617,987 | 11/1971 | Sankey | 439/184 |
| 3,624,594 | 11/1971 | Trimble et al. | 439/523 |
| 3,649,952 | 3/1972 | Harmon | 439/921 |
| 3,678,432 | 7/1972 | Boliver | 439/921 |
| 3,711,818 | 1/1973 | Swehla | 439/89 |
| 3,725,846 | 4/1973 | Strain | 439/89 |
| 3,736,505 | 5/1973 | Sankey | 439/921 |
| 3,753,203 | 8/1973 | Link | 439/921 |
| 3,793,614 | 2/1974 | Tachick et al. | 439/88 |
| 3,818,407 | 6/1974 | Edgerton | 337/199 |
| 3,853,375 | 12/1974 | McClain | 439/89 |
| 3,860,322 | 1/1975 | Sankey et al. | 439/184 |
| 3,868,164 | 2/1975 | Lisk | 439/88 |
| 3,883,208 | 5/1975 | Sankey et al. | 439/921 |
| 3,980,374 | 9/1976 | Fallot | 439/88 |

(List continued on next page.)

OTHER PUBLICATIONS

Bulletin 96011—Mar. 1996—Cooper Power Systems—"200 A Molded Rubber Product Application" and "600 A Molded Rubber Product Application".

Electrical Apparatus 500–46—Jan. 1990—Cooper Power Systems—"Molded Rubber Products—200 A 35 kV Class Three–Phase Loadbreak Elbow Connector".

*Primary Examiner*—Steven L. Stephan
*Assistant Examiner*—J. F. Duverne
(74) *Attorney, Agent, or Firm*—Fish & Richardson P.C.

(57) ABSTRACT

A high voltage electrical connector (50) interconnects sources of energy, such as transformers and circuit breakers, to distribution systems and the like via a high voltage cable (37). The high voltage electrical connector (50) includes an access cavity (58) providing access to the interior of the electrical connector. The access cavity (58) may be fitted with an insert plug (20) or an insert injection plug (120). The inserts (20, 120) include a conductive shield (36, 136) to reduce the possibility of electrical discharges from the inserts.

29 Claims, 5 Drawing Sheets

U.S. PATENT DOCUMENTS

| | | | |
|---|---|---|---|
| 4,060,785 | 11/1977 | Hanke et al. | 337/201 |
| 4,152,643 | 5/1979 | Schweitzer, Jr. | 174/11 BH |
| 4,175,815 | 11/1979 | Andersen et al. | 439/89 |
| 4,202,591 | 5/1980 | Borgstrom | 439/921 |
| 4,758,171 | 7/1988 | Hey | 439/181 |
| 4,865,559 | 9/1989 | Clabburn | 439/921 |
| 4,904,932 | 2/1990 | Schweitzer, Jr. | 174/11 BH |
| 4,946,393 | 8/1990 | Borgstrom et al. | 439/88 |
| 5,082,449 | 1/1992 | Borgstrom et al. | 439/88 |
| 5,215,475 | 6/1993 | Stevens | 439/88 |
| 5,221,220 | 6/1993 | Roscizewski | 439/921 |
| 5,393,240 | 2/1995 | Makal et al. | 439/921 |
| 5,573,410 | 11/1996 | Stepniak | 439/88 |

HIGH VOLTAGE ELECTRICAL CONNECTOR WITH ACCESS CAVITY AND INSERTS FOR USE THEREWITH

BACKGROUND OF THE INVENTION

1. Field of the Invention

The present invention relates to high voltage electrical connectors for high voltage cable conductors, and more particularly, to insert plugs and injection plug inserts for insertion in an access cavity of such high voltage electrical connectors.

2. Description of the Related Art

High voltage electrical connectors interconnect sources of energy, such as transformers and circuit breakers, to distribution systems and the like via high voltage cables. These high voltage electrical connectors typically interconnect cables having 15 to 35 kV of electric potential, and are configured such that at least one of the interconnected cables may be easily disconnected from the high voltage electrical connector to create a "break" in the circuit. Because the high voltage electrical connectors may experience corona and other electrical discharges and must be handled by servicemen, they include many safety features to minimize the risk of injury and chance of structural damage to the connector itself and other nearby equipment.

For instance, a conventional high voltage electrical connector or "elbow" connector includes a cable connector assembly within the body of the elbow connector for interconnecting or electrically coupling one cable within the high voltage electrical connector to a mating electrical contact structure of an associated, mating bushing. The mating bushing is, in turn, electrically connected or coupled to a transformer or other electrical apparatus. The cable connector assembly is surrounded by an insulating dielectric material, except for openings providing access to the internal connector assembly. The insulating dielectric material is surrounded by a conductive shield, typically a molded boot-like item. The conductive shield is electrically connected to a ground such that any voltage which may form on the surface of the electrically insulating material or any electrical discharges near the connector are immediately dissipated to ground.

However, experience has shown that it is desirable to have access to the interior of the high voltage electrical connector. For example, it is often desirable to vent gases from the interior of the connector, conduct tests on the interior cable connector assembly, or take measurements from within the connector. Thus, conventional high voltage electrical connectors may include an access hole extending from the outside of the connector and through the insulative material such that the internal cable connector assembly is exposed.

One use of such an access hole is to inject an insulating liquid into the cable extending from the connector to improve the dielectric strength of the insulative material within the cable. This insulating liquid restores the damaged insulation, rejuvenating the connector. The cables connected to the connector typically include a continuous and cylindrical insulative sheath surrounding the high voltage conductive interior of the cable. This insulative sheath is surrounded by a grounded conductive sheath of metallic material wires located on the exterior of the cable, keeping it at ground potential, tying all neutrals together, and providing a return path for any fault current that may flow due to cable failure.

If water or other contaminants enter into and deteriorate the insulative sheath of the cable, the cable may fail. Thus, the insulating liquid is injected into the cable through the access hole to rejuvenate the dielectric strength of the insulative sheath. For instance, the insulative liquid may be injected into the connector and forced along the entire length of the cable. This insulative liquid penetrates the molecular structure of the cable insulation and cures in place. This re-establishes the original dielectric strength of the cable, greatly lessening the potential for cable failure.

Regardless of the reason for requiring access to the interior of the connector, one dramatic potential problem associated with conventional connectors is that arcing or corona discharges may occur when attempting to gain access to the access hole. This especially may occur when one is working with the connector, such as attempting to inject fluids into the electrical connector and attached cable through the access hole.

A conventional high voltage electrical connector includes a projection of insulating material extending from the grounded conductive shield of the connector body. See, e.g., U.S. Pat. Nos. 4,946,393 and 5,082,449. The access hole is formed in this insulating material projection. Because the insulating projection represents a break in the grounded conductive shield, a separate conductive cap of elastomeric material is configured to fit over the insulative projection and abut against the conductive shield of the body such that the integrity of the grounded shield is maintained. An insulating rod is typically attached to the conductive cap such that it extends into the access hole when the cap is in place. That is, the cap includes a cavity located within the cap for receiving a head of the insulating rod in an interference fit manner so that the two items are attached to each other. When the cap is positioned over the insulative projection, the insulating rod fits within the access hole in an interference fit to provide a dielectric seal. Nevertheless, when the cap and the attached rod are removed from the projection, in order to service or perform tests on the electrical connector, the dielectric seal is broken and the insulative projection is exposed such that there is a large break in the grounded conductive shield.

Due to capacitive coupling, it is common for this exposed insulative projection to develop a high electric potential, especially near the base of the projection even though the insulating material may have excellent dielectric characteristics. Thus, when the cap is removed from the insulative projection, the surface of the projection may be floating at a voltage higher than ground. This voltage may cause corona discharges. After the cap and rod have been removed, an injection port may be inserted into the access hole. Corona discharges may problematically occur during this process because the insulative projection is exposed without a ground shield and the dielectric seal has been broken.

The injection port permits a gas or liquid to be injected into or removed from the interior of the connector and/or cable via the hole formed in the injection port. Conventional injection ports are formed from an insulative material and are sized to fit within the access hole to provide a dielectric seal, similar to the injection plug. These conventional injection ports do not include any grounded shield.

Before or after insertion of a conventional injection port into the access hole, a hose or similar item is connected to a hose connector on the injection port so that the desired maintenance, fluid injection, or tests may be initiated. Because the injection port is not covered with a grounded shield, the surface of the insulating projection and the hose connector may have a dangerous electric potential. This potential may cause arcing. Furthermore, the opportunity for a high surface voltage due to capacitive coupling is enhanced because the liquid, gas, or contaminants within the cable that are removed from the electrical connector and/or cable may be good conductors.

Moreover, because the exiting gases and/or liquids may be conductive, electrical arcing may occur directly out of the hole in the injection port, stemming from the high voltage internal components of the connector. Because the injection port has no conductive shield of any sort, dielectric breakdown of the surrounding air may occur, resulting in arcing to the external surface of the electrical connector and/or other external items, causing damage or injury.

Thus, it is apparent that when a conventional conductive cap is on an insulative projection and when the attached insulating rod is properly placed in the access hole, the ground shield and dielectric seal are operable and capacitive coupling to the surface of the insulating material is typically not a problem. However, when the cap and rod are removed, the insulative projection of the connector is exposed and may have a dangerous electric potential. Furthermore, when the cap and rod are replaced with an injection port, the entire surface of the injection port may float at some voltage significantly higher than ground, and a serious risk of electrical discharges exists when attempting to service the electrical connector through the injection port.

The above-described constraints and problems associated with conventional high voltage electric connectors has created a need for a solution.

SUMMARY

A primary object of the embodiments of the present invention is to provide an insert for insertion in an access cavity of an electrical connector which minimizes the occurrence of corona and other electrical discharges.

Another object of the embodiments of the present invention is to provide an insert for insertion in an access cavity of an electrical connector which is conductively shielded.

Another object of the embodiments of the present invention is to provide an insert for insertion in an access cavity of an electrical connector which permits easy and safe access to the internal components of the electrical connector.

Still another object of the embodiments of the present invention is to provide an insert which permits fluids and other items to be safely removed from and injected into the interior of the electrical connector.

Yet another object of the embodiments of the present invention is to provide an insert which is capable of being grounded on all exposed surfaces of the insert.

Another object of the embodiments of the present invention is to provide a high voltage electric connector which minimizes the occurrence of corona and other electrical discharges.

Another object of the embodiments of the present invention is to provide a high voltage electric connector which includes an insulative projection that is shielded even when an insert plug is removed from an access cavity formed in the insulative projection.

Another object of the embodiments of the present invention is to provide an insert plug which minimizes the occurrence of corona and other electrical discharges.

Still another object of the present invention is to provide an injection plug which minimizes the occurrence of corona and other electrical discharges.

According to the embodiments of the present invention, the foregoing and other objects are obtained by an insert for insertion in an access cavity of an electrical connector. The insert includes a body made from an insulative material. The body includes an insertion portion and an exposure portion. The insertion portion includes a shaft sized to be matingly received by the access cavity of the electrical connector. The exposure portion includes an exterior surface, means for removing the insert from the cavity, a conductive coating fixedly adhered to the exterior surface of the exposure portion, and means for electrically coupling the conductive coating with a conductive surface of the electrical connector.

According to the present invention, the foregoing and other objects and advantages are obtained by a high voltage electrical connector. The high voltage electrical connector includes a body portion of electrically insulative material, and a body portion conductive external shield at least partially surrounding the body portion. The electrical connector also includes a projection of electrically insulating material having a first end connected to the body portion and a second end extending from the body portion. An access cavity extends through the projection and has an opening in the second end of the projection. The access cavity communicates an exterior of the electrical connector with a conductive portion of an interior of the electrical connector. A projection conductive external shield is secured to the projection, and the projection conductive external shield is permanently electrically coupled to the body portion conductive external shield. The projection conductive external shield extends from the body portion conductive external shield at least to the second end of the projection.

According to the present invention, the foregoing and other objects and advantages are obtained by a high voltage electrical connector which includes a body portion made of an electrically insulative material, a conductive external shield surrounding the body portion, an access cavity communicating an exterior of the connector with an interior of the conductor coupling assembly, and an insert having a body made from an insulative material. The body has an insertion portion received by the access cavity and an exposure portion. The exposure portion includes an exterior surface, means for removing the insert from the cavity, a conductive coating fixedly secured to the exterior surface of the exposure portion, and means for electrically coupling the conductive coating with the conductive external shield.

According to the present invention, the foregoing and other objects and advantages are obtained by a dielectric injection plug comprising a body made from an insulative material. The body has an insertion portion and an exposure portion. The exposure portion has an attachment portion. The insertion portion includes a shaft. The exposure portion includes an exterior surface, a grasping portion, a conductive shield covering the exterior surface of the exposure portion, and an electrical coupling member for electrically coupling the conductive coating with a conductive surface. The exposure portion, the insertion portion, and the attachment portion include a continuous internal channel through which a fluid may travel. The attachment portion has an attachment opening to the channel and the insertion portion has an access opening to the channel.

According to the present invention, the foregoing and other objects and advantages are obtained by a high voltage electrical connector assembly. The high voltage electrical connector assembly includes a high voltage electrical connector having a body portion of electrically insulative material, a body portion conductive external shield at least partially surrounding the body portion, a projection of electrically insulating material extending from the body portion, and an access cavity extending through the projection. The access cavity communicates an exterior of the electrical connector with a conductive portion of an interior of the electrical connector. A projection conductive external shield is secured to the projection, and the projection conductive external shield is permanently electrically coupled to the body portion conductive external shield. Also included in the assembly is an insert plug and an injection plug for insertion into the access cavity. The insert plug includes an insert plug external conductive shield, and means for electrically coupling the insert plug external conductive shield with the projection conductive external shield. The injection plug has an internal channel therethrough for injecting a fluid into the connector, an injection plug external conductive shield, and means for electrically coupling the injection plug external conductive shield with the projection conductive external shield.

Still other objects and advantages of the present invention will become readily apparent to those skilled in the art from the following detailed description, where we have shown and described the preferred embodiment of the present invention. As will be realized, the invention is capable of other and different embodiments, and its several details are capable of modification in various obvious aspects, all without departing from the invention. Accordingly, the drawings and description are to be regarded as illustrative in nature, and not limitative.

DETAILED DESCRIPTION OF THE PREFERRED EMBODIMENTS

Figure 1:
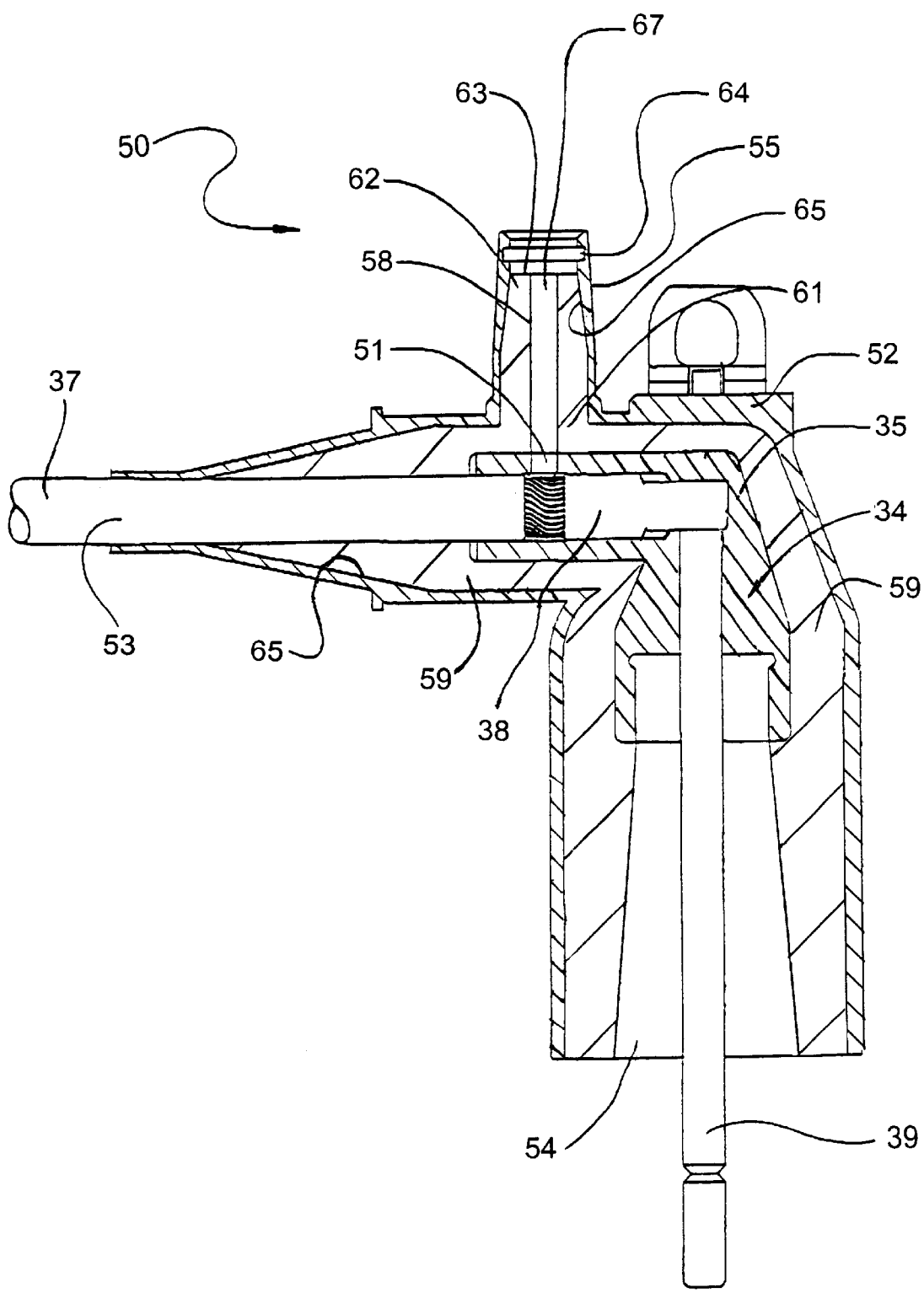
FIG. 1 is an elevational side view of a high voltage connector according to one embodiment of the present invention.
Figure 3:
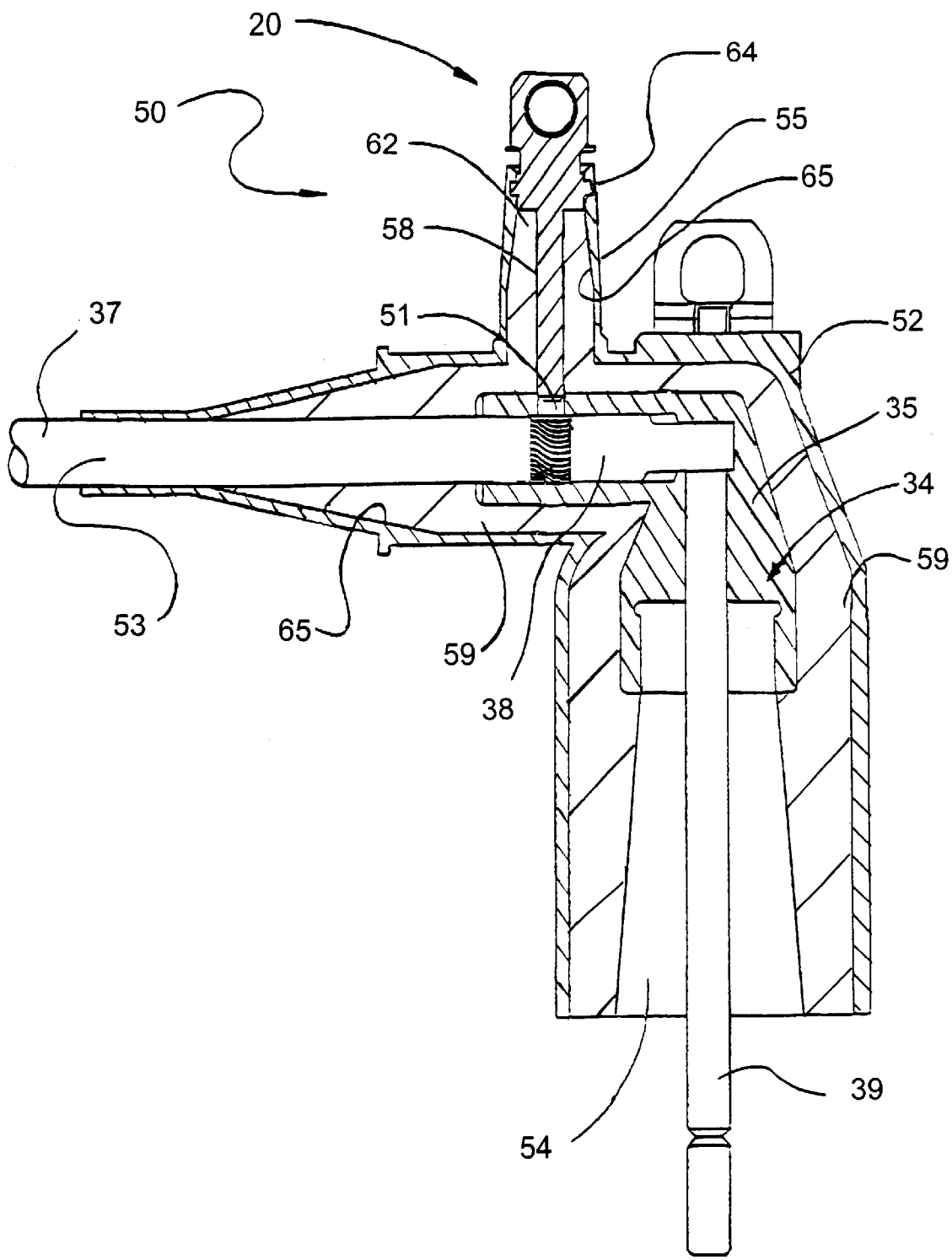
FIG. 3 is an elevational side view of a high voltage connector according to another embodiment of the present invention.
Figure 6:
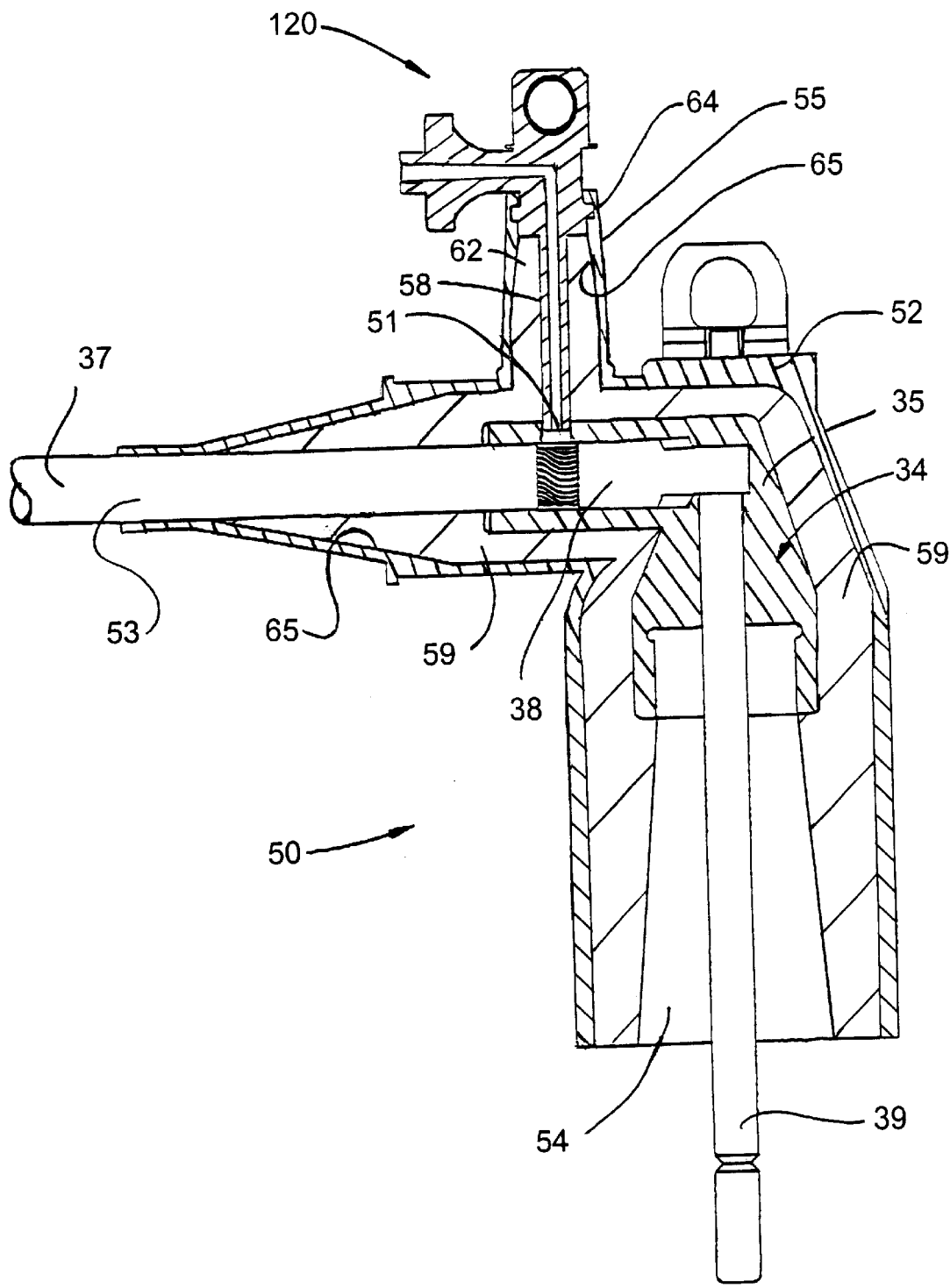
FIG. 6 is a side view of a high voltage connection according to another embodiment.

Referring to FIGS. 1, 3, and 6, shown is a high voltage electrical connector or "elbow" 50 according to one embodiment of the present invention. The high voltage electrical connector 50 is for interconnecting sources of energy, such as transformers and circuit breakers, to distribution systems and the like via a high voltage cable 37. The electrical connector 50 typically interconnects electric sources having 10 to 45 kV of electric potential, preferably 15 to 35 kV, by a conductor coupling assembly 34 located within the connector. The conductor connector assembly 34 is configured in a manner well known in the art such that the cable conductor strands within the interior of the cable 37 are electrically coupled with a probe 39.

As shown in FIG. 1, the conductor coupling assembly 34 includes a crimptype or compressive connector 38 for coupling the conductive strands of the cable 37 to the probe 39. The probe 39 is threaded into one end of the compression connector 38. The probe 39 is configured to mate with a female connector device of an associated bushing, allowing easy connection and disconnection of the connector 50 to energize and "de-energize" the cable 37. Surrounding the crimp connector 38 and the base of the probe 39 is a semiconductive insert or a "faraday cage" 35 having the same electric potential as the cable 37 and probe 39. The faraday cage 35 prevents corona discharges within the conductor coupling assembly 34. So configured, the connector 50, via the conductor coupling assembly 34, may be easily disconnected from the transformer or other electrical device to create a "break" in the circuit. The connector 50 includes an insulative projection 62 having an access cavity 58 providing access to the interior of the electrical connector 50.

As illustrated in FIGS. 1, 3 and 6, the high voltage electrical connector or "elbow" 50 includes a body portion 59 and an external conductive shield 52 molded from a conductive elastomeric material, such as a terpolymer elastomer made from ethylene-propylene diene monomers loaded with carbon, and/or other conductive materials well known in the art. A preferred conductive material is carbon loaded ethylene-propylene terpolymer (EPT or EPDM). The conductive external shield 52 is preferably pre-molded in a shape of an elbow and includes a cable opening 53 for receiving a high voltage cable, and a connector opening 54 for receiving an electrical connection device. Thus, the body portion conductive external shield 52 partially surrounds the body portion 59. As described above, the probe 39 is easily separable from the electrical connection device within the high voltage electrical connector 50 such that the electric connector is commonly referred to as being a "separable" connector.

The body portion 59 is made from an insulative material, preferably EPDM. The body portion 59 occupies the space between the conductor coupling assembly 34 and the conductive external shield 52. Thus, the insulative body portion 59 surrounds the semiconductive insert 35 of the conductor coupling assembly 34. The insulative body portion 59 forms a dielectric and electrically insulative barrier between the high voltage internal components and the conductive external shield 52. The insulative body portion 59 also includes openings for receiving the high voltage cable 37 and an electrical connection device such that they may be electrically connected to the conductor coupling assembly 34 within the interior of the electrical connector 50. Thus, the body portion conductive external shield 52 partially surrounds the body portion.

It is often desirable to gain access to the interior of the electrical connector 50. To enable this access, the connector 50 according to the present invention includes an access cavity 58 located in a projection 62 of insulative material extending from the body portion 59. The access cavity 58 is preferably a straight hole extending from the exterior of the electrical connector 50 through the insulative projection 62 and into the insulative body 59 such that at least a portion of the high voltage items within the connector, preferably at least the interior of the conductor coupling assembly 34, are exposed. Although the access cavity 58 is preferably a straight cylindrical hole, other shapes are contemplated. For instance, the access cavity 58 may be inclined with respect to the conductive external shield 52, and be conical, square, triangular, oval, or other numerous configurations, so long as the interior of the high voltage electrical connector 50 is exposed.

The insulative projection 62 is covered with a premolded conductive boot referred to as the projection conductive external shield 55. In the embodiment illustrated in FIGS. 1, 3 and 6, the projection 62 and the access cavity 58 are preferably located near the female connector 57, such that the access cavity includes an opening 51 in the interior of the female connector of the conductor coupling assembly 34. However, the access cavity 58 and the insulative projection 62 may be located at any number of different locations around the electrical connector 50 and still be within the confines of the present invention.

The projection conductive external shield 55 is positioned over the area of the electrical connector 50 where the access cavity 58 is intended to reside. The projection external conductive shield 55 may be formed integrally with the conductive external shield 52 by one molding process such that they are integral and one piece, or they may each be formed separately and then permanently attached to each other by welding, gluing, or other means by which the two are electrically coupled to each other. Either way, the projection external conductive shield 55 is fixedly or permanently secured to the body portion conductive external shield 52 such that it is not readily removable or detachable.

After the projection external conductive shield 55 is in the proper location, the body portion conductive external shield 52 and the projection conductive external shield 55 are filled with an insulative material to form the body portion 59 and the insulative projection 62. The insulative projection 62 may be formed in a separate step, or the projection and the body portion 59 may be formed in one step such that they are one piece or integral with each other. Likewise, the projection 62 and the body portion 59 may be formed from different insulative materials or the same material. Preferably, the projection 62 and the body portion 59 are formed from the same insulative material.

After the insulative projection 62 has been formed, the access cavity 58 is formed in the center of the insulative projection, for example, by removing a pre-positioned mandrel from the insulative material. However, the access cavity 58 may be formed by other methods. For example, the access cavity 62 may be formed by drilling through the insulative material to the interior of the electrical connector 50. Thus, once the access cavity 62 has been formed, it is apparent that the projection external conductive shield 55 at least partially surrounds the access cavity 58. The access cavity 62 communicates the exterior of the electrical connector 50 with a conductive portion of the interior of the electrical connector, preferably with the interior of the conductor coupling assembly 34 located within the interior of the insulative body 59.

The insulative projection 62 includes two opposing ends 61, 63. The first end 61 of the insulative projection 62 is generally the area of the projection connected to the body portion 59, even though, as previously described, the insulative projection 62 and the body portion 59 may be one piece or formed separately. The second end 63 of the insulative projection 62 is located opposite from the first end 61, and extends away from the body portion 59. As illustrated in FIG. 1, the opening 67 of the access cavity into the insulative projection 62 is located in the second end 63 of the projection.

The conductive external shield 52 and the projection conductive external shield 55 are typically electrically connected to ground such that they will dissipate any surface voltage on the external surface 65 of the insulative body 59 and the insulative projection 62. Although the insulative body 59 and the insulative projection 62 are formed from dielectric materials and are intended to prevent electric current from traveling there through, it is common for the external surface 65 of the insulation to develop a high voltage due to capacitive coupling. Dielectric materials contemplated for the present invention are those materials which are electrical insulators or in which an electric field can be sustained with a minimum dissipation of power. In general, a solid material is suitably dielectric if its valence band is full and is separated from its conduction band by at least 3 eV. Dielectric materials from which the body portion may be formed are well known in the art and include, for example, EPDM.

All dielectric materials have some degree of conductivity, which generally increases with temperature and the electric field applied to the dielectric material. When used in high voltage electrical connectors, dielectric materials experience capacitive coupling, allowing a high voltage to form on the external surface 65 of the insulative body 59 and the insulative projection 62. This surface voltage problem may be further enhanced because of contaminants within the electrical connector 50. Because of this effect, the grounded conductive external shield 52 and the projection conductive external shield 55 abut against the external surface 65 of the projection 62 and body 59 such that any voltage which may develop thereon may be dissipated to ground. To achieve this end, the projection conductive external shield 55 extends from the body portion conductive external shield 52 at least to the second end 63 of the insulative projection 62. In the embodiment illustrated in FIGS. 1, 3, and 6, the projection conductive external shield 55 preferably extends above the second end 63 of the insulative projection 62.

Thus, because the projection conductive external shield 55 is fixedly secured to the body portion conductive external shield 52, the insulative projection 62 is not substantially exposed such that any electric potential on the external surface 65 of the insulative bodies is not a problem, especially when attempting to gain access to the access cavity 58.

Water and other contaminants may enter the interior of the cable 37 through open ends of the cable during installation of the cable. Contaminants may also enter the interior of the cable through poorly sealed connection devices or joints, and by migrating through the insulation of the cable. Once contaminants enter the cable 37, they can migrate through the cable and enter the interior of the high voltage connector 50. These contaminants cause damage to the high voltage cable insulation. These contaminants may also react with the cable insulation and the electrical fields to form tree-shaped voids in the cable insulation. These voids can compromise the dielectric integrity of the cable insulation. Thus, the present invention provides access to the interior of the electrical connector 50 and connected cables by the access cavity 58 such that the above-described contaminants may be removed and replaced with an insulating liquid to restore the insulative barrier and rejuvenate the dielectric areas within the high voltage electrical connector and high voltage cables.

As further described below, the above-described contaminants inside the electrical connector 50 and cables may be removed via the access cavity 58 formed in the projection 62. However, because the access cavity 58 is necessarily a small break in the grounded external shield of the electrical connector 50 and in the dielectric seal of the body position 59, it is also necessary that the access cavity 58 be dielectrically sealed and that the grounded external shield be completed when it is not necessary to have access to the internals of the electrical connector for testing or maintenance. To dielectrically seal the access cavity 58 and complete the grounded external shield surrounding the insulative body 59 and insulative projection 62, an insert or insert plug 20 illustrated in FIG. 2 may be used when it is not necessary to gain access through the access cavity.

Figure 2:
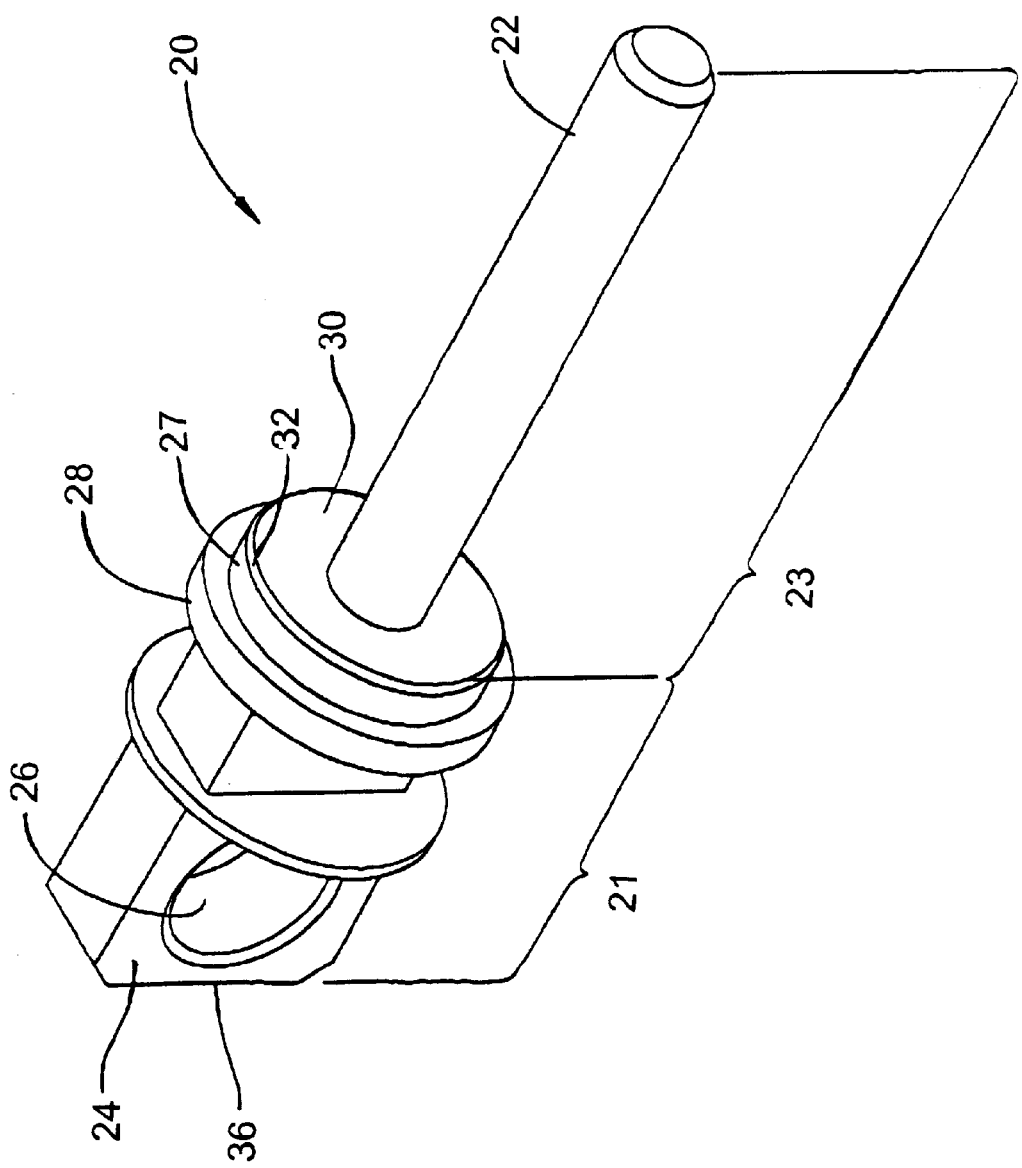
FIG. 2 is an elevational perspective view of an embodiment of an insert according to the present invention.

FIG. 2 illustrates one embodiment of an insert or insert plug 20 according to one aspect of the present invention, which will be described in reference to the electrical connector 50 illustrated in FIG. 3. The body of the insert 20 shown in FIG. 2, like the insulative body 59 and insulative projection 62, is preferably formed from an insulative material. The body of the insert 20 includes an insertion portion 23 and an exposure portion 21. The exposure portion 21 includes a head 24, and the insertion portion 23 includes a shaft 22 located opposite from the head 24. The shaft 22 is sized to be matingly received by the access cavity 58 of the electrical connector 50. Thus, the access cavity 58 of the electrical connector 50 may be dielectrically sealed by the shaft 22 of the insertion portion by inserting the shaft into the access cavity such that the exterior surface of the shaft matingly engages the surface of the access cavity in an interference-fit manner. This tight-fitting arrangement has two functions. First, the access cavity 58 is sealed to prevent materials from entering or exiting the interior of the electrical connector 50. Second, the continuity of the dielectric insulative projection 62 is restored. The shaft 22 and the head 24 extend along the longitudinal axis of the insert 20.

The exposure portion 21 of the insert also includes a hole 26 formed in the head 24 of the insert body which functions as a grasp by which the insert may be removed from the access cavity 58. Although the hole 26 is preferred, other configurations for removing the insert shaft 22 from the cavity 58 are contemplated. For example, a hook, loop, screw, threads, handle, clasp, finger, digit, grip, grasp, bow, knob, bar, shaft, bracket, brace or other means by which the insert 20 may be removed from the access cavity 58 are contemplated. The hole 26 is preferred because it is easily formed and is adapted for use with a "hot stick" well known in the art. The head 24 and the hole 26 formed therein may also be used to insert the shaft 22 into the access cavity 58. As illustrated in FIG. 2, the axis of the hole is preferably perpendicular to the longitudinal axis of the insert 20.

In the embodiment of the insert plug 20 illustrated in FIG. 2, the exposure portion 21 includes a layer of conductive material or a conductive coating 36 bonded to the entire exterior surface of the exposure portion 21. That is, the conductive coating 36 is fixedly adhered to the exterior surface of the exposure portion 21 such that it is intended to remain on the exterior surface indefinitely and is not readily removable. The conductive coating 36 may be sprayed on the exterior surface or deposited by any number of processes, such as painting or metalizing well known in the art. The exposure portion 21 of the insert plug 20 includes all portions of the insert body that are exposed when the insertion portion 23 is received in the access port 58. It further includes a portion of a coupling member 28 to ensure a good electrical connection between the conductive coating 36 and the external shield 55 of the projection 62. Although the conductive coating 36 of the preferred embodiment of the present invention illustrated in FIG. 2 is fixedly adhered to the entire surface area of the exposure portion 21, it may only be on a portion of the exposure portion. For example, it may be desirable to leave a small portion of the exposure portion 21 free from any conductive coating for testing purposes.

In the embodiment of the present invention illustrated in FIG. 2, the insert 20 includes the coupling member 28 for electrically coupling the conductive coating 36 with the projection conductive external shield 55, which is electrically coupled to the connector body conductive external shield 52. The coupling member 28 preferably includes a radially extending cylindrical surface 27 which is received by a recess 64 incorporated in the insulative projection 62. The coupling member 28 is received by the recess 64 such that the conductive coating 36 on the radially extending cylindrical surface 27 and the coating on the coupling member 28 are in electrical contact with the projection conductive external shield 55 surrounding the access cavity 58. Thus, when the insert 20 is inserted into the access cavity 58 such that the coupling member 28 is received by the recess 64, the conductive coating 36 on the exterior portion 21 is electrically coupled to the shields 55 and 52 such that the conductive coating 36 is at ground potential when the shields 52, 55 are at ground potential. When the conductive coating 36 of the exterior portion 21 of the insert 20 is coupled to the shields 55, 52, which are coupled to ground potential, any surface voltage that may develop on the exterior surface of the insulative body of the insert due to capacitive coupling and any corona discharges arcing to the coating 36 are dissipated to ground. As compared to conventional insert plugs, the insert 20 does not depend upon a separate conductive cap attached to an insulating rod because the conductive coating 36 is fixedly adhered to the exterior surface of the insert plug 20. This is advantageous because there is no risk that the conductive coating 36 may dislodge or separate from the insert 20, and the continuity of the electrical connection between the coating 36 and the insulative material of the insert 20 is uniform and stable. Furthermore, because the projection conductive shield 55 is fixedly secured to the connector body conductive external shield 52, not to the insert plug 20, the removal of the insert plug 20 does not cause the insulative projection 62 to be dangerously exposed without a conductive external shield. Thus, it is apparent that when the insert shaft 22 is removed from the access cavity 58, a ground shield, via the projection conductive shield 55, is still present on the insulative projection 62, except for the second end 63 of the projection.

The preferred configuration for electrically coupling the conductive coating 36 to the conductive surface of the electric connector (the access cavity conductive shield 55 and the body conductive external shield 52) is the coupling member 28, which is a snap-fit or latching ring type coupler well known in the art. Nevertheless, other configurations and types of electrical connectors and couplers are contemplated as long the couplers electrically couple the conductive coating 36 with a conductive surface of the connector 50. For example different fasteners such as mechanical threads, a screw, pin, snap, wire, latch, hook, buckle, conductive adhesive, or an interference fit may be used to electrically couple the conductive coating 36.

Once the shaft 22 of the insert 20 is positioned in the access cavity 58 and the coupling member 28 is electrically coupled to the conductive surface 52 of the connector 50, the flat surface 30 abuts against the insulative projection 62 such that there is preferably no air between the surface 30 and the insulative projection. Although the flat surface 30 is not coated, the beveled surface 32 between the flat surface 30 and the radial surface 27 is coated with the conductive coating 36 because it is also electrically coupled with the conductive surface 55 of the electrical connector 50. Thus, it is apparent that the exposure portion 21 of the insert body includes those portions that are electrically coupled with a conductive surface of the connector 50, although possibly not generally "exposed" to the external environment. The exposure portion 21 is that portion of the insert body that is not the insertion portion 23, where the insertion portion includes that which forms a dielectric seal with the access cavity 58 and the insulative projection 62.

Figure 5:
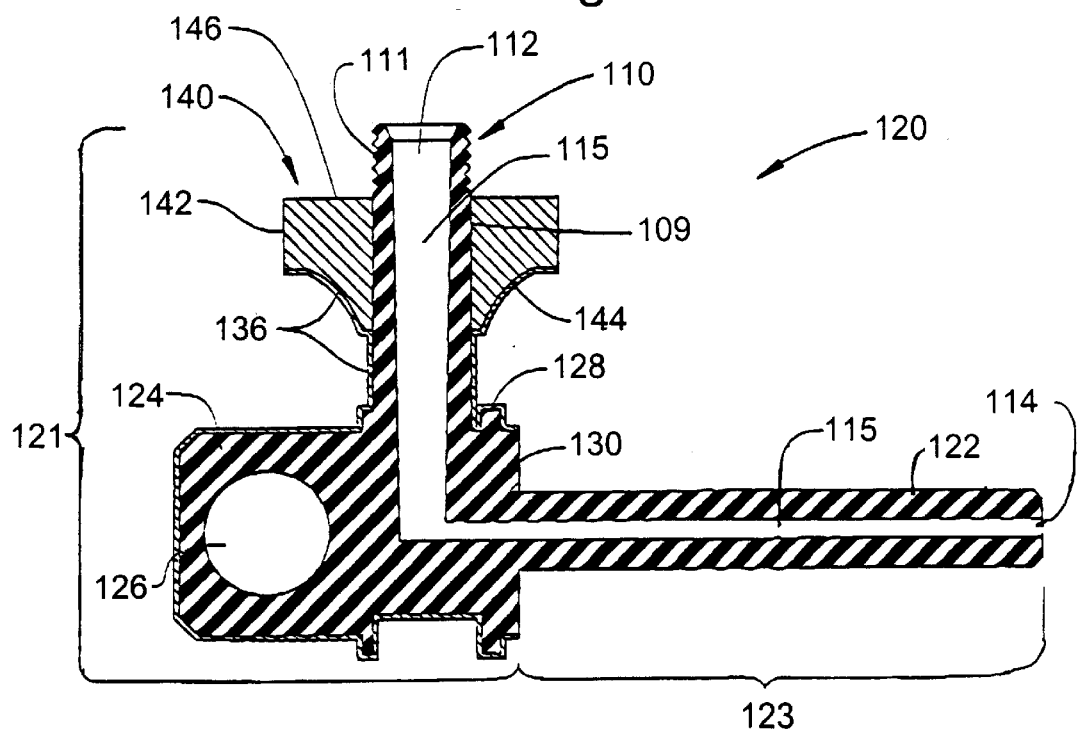
FIG. 5 is a cross-sectional side view of an embodiment of an insert according to the present invention.
Figure 4:
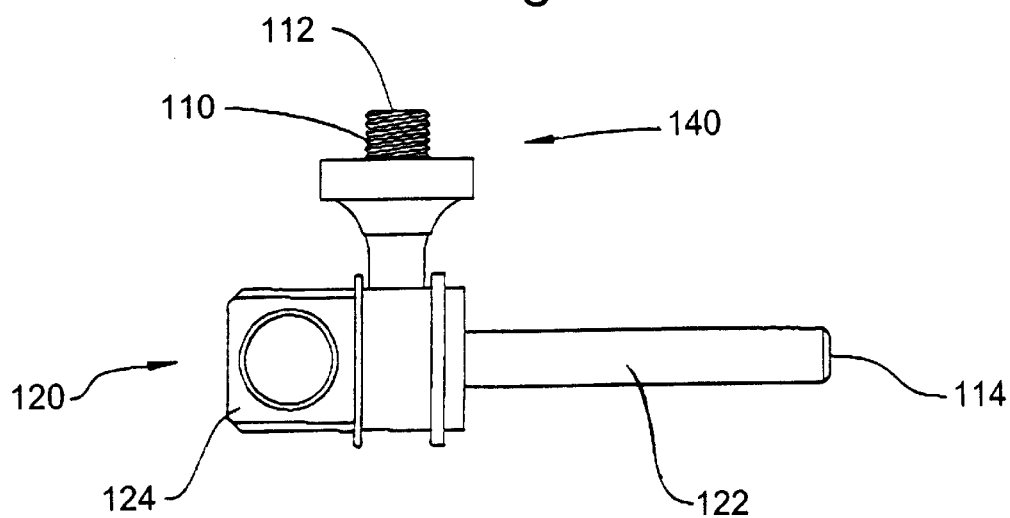
FIG. 4 is an elevational side view of an embodiment of an insert according to the present invention.

FIGS. 4 and 5 illustrate an injection plug 120, which is illustrated with the high voltage electrical connector 50 in FIG. 6. Features on the injection plug 120 that are similar to features on the insert 20 are assigned corresponding reference numbers, increased by 100. Thus, the above discussion of the benefits and functions of the different components of the insert 20 also applies to the injection plug 120. However, the injection plug 120 includes many additional features and inherent functions, as discussed below.

The body of the injection plug 120 shown in FIGS. 4 and 5, like the insulative body 59 and insulative projection 62 is formed from an insulative material. The body of the injection plug 120 includes an insertion portion 123 and an exposure portion 121. As illustrated in FIG. 5, the insertion portion 123 and the exposure portion 121 are generally perpendicular to one another, although other orientations are contemplated. The insertion portion 123 includes a shaft 122 sized to be matingly received by the access cavity 58 of the electrical connector 50. Thus, the access cavity 58 of the electrical connector 50 may be dielectrically sealed by the shaft 122 of the insertion portion by inserting the shaft into the access cavity such that the exterior surface of the shaft matingly engages the surface of the access cavity 58 in an interference fit manner. As is apparent from FIGS. 4 and 5, the injection plug 120 includes a continuous internal channel 115.

The body of the injection plug 120, like the insert 20, includes an exposure portion 121 and an insertion portion 123. The exposure portion 121 also includes an attachment portion 110. The exposure portion 121, the insertion portion 123, and the attachment portion 110 include the continuous internal channel 115 through which a fluid may travel. The channel 115 is for removing fluids such as liquids and gases and other contaminants from the interior of the high voltage electrical connector 50. The channel 115 is also for inserting fluids, such as insulating liquids into the interior of the electrical connector 50. Thus, the attachment portion 110 of the exposure portion 121 has an attachment opening 112 to the channel 115 and the insertion portion 123 has an access opening 114 to the channel 115.

The exposure portion 121 of the injection plug 120 also includes a hole 126 formed in the head 124 of the insert body which functions as a grasp by which the insert may be removed from the access cavity 58. When the insert plug 20 shown in FIG. 1 is removed from the electrical connector 50 with the aid of the hole 26, the insertion portion 123 of the injection plug 120 may be inserted into the access cavity 58 of the electrical connector. The external surface of the shaft 122 will form a dielectric seal with the interior surface of the access cavity 58, and the coupling member 128 will electrically couple the conductive coating 136 on the exposure portion 121 with a conductive surface of the electrical connector, preferably the access cavity conductive shield 55.

In the embodiment of the injection port 120 illustrated in FIGS. 4 and 5, the exposure portion 121 includes a conductive coating 136, preferably bonded to the entire exterior surface of the exposure portion, except for the attachment portion 110. However, the conductive coating 136 may be on a lesser or greater surface area of the exposure portion and still be within the confines of the present invention. The exposure portion 121 of the injection port 120 includes all portions of the insert body that are exposed when the insertion portion 123 is received in the access cavity 58. It further includes a portion of a coupling member 128 to ensure a good dielectric connection between the conductive coating 136 and the external shield 55 of the projection 62. The exposure portion 121 is that portion of the insert body that is not the insertion portion 123, where the insertion portion includes that which forms a dielectric seal with the access cavity 58 and the insulative projection 62.

The injection plug 120 includes the coupling member 128 for electrically coupling the conductive coating 136 with the access cavity conductive external shield 55, which is in electrical communication with the connector body conductive external shield 52. The coupling member 128 cooperates with the recess 64 incorporated in the insulative projection 62. The coupling member 128 is received by the recess 64 such that the conductive coating 136 on the exposure portion 121 is in electrical contact with the conductive external shield 55 at least partially surrounding the access cavity 58. Thus, when the insertion portion 123 of the injection plug 120 is inserted into the access cavity 58 such that the coupling member 128 is received by the recess 64, the conductive surface 136 on the exterior portion 121 is electrically coupled to the shields 55 and 52. Thus, the conductive coating 136 is at ground potential if the shields 52, 55 are at ground potential. Because the conductive surface 136 of the exterior portion of the injection plug 120 is at ground potential, any surface voltage that may develop on the exterior surface of the insulative body of the injection plug 120 due to capacitive coupling and any corona discharges are dissipated to ground. Conventional injection ports do not include any conductive coating or shields of any sort, and, thus, do not prevent corona discharges from occurring. For example, when a serviceman attempts to couple an injection line to a conventional injection port to remove contaminants from the interior of a high voltage electrical connector 50, the exterior surface of the conventional injection port may be at a voltage high enough to cause a corona discharge. The injection plug 120 according to the present invention reduces the chances of such corona discharges because at least a portion of the exterior surface of the exposure portion 121 is preferably covered with a conductive shield, which in the embodiment illustrated in FIG. 5 is the conductive coating 136. Furthermore, the insulative projection 62 and the access cavity 58 formed therein are a length sufficient to substantially prevent current flow or flash over from the conductive portion of the interior of the electrical connector 50 through the access cavity. That is, the length of the access cavity 58 is sufficient to prevent current flow from the interior of the electrical connector 50 to exterior items. In a preferred embodiment of an electrical connector 50 configured to accommodate 35 kV cables, the access cavity 58 extends approximately 2½ inches from the access opening 51 in the conductor coupling assembly 34.

Although the conductive coating 136 is the preferred conductive shield, other conductive shields are contemplated for the exposure portion 121 of the injection plug 120. For example, a conductive elastomeric cover or pre-molded cap may also form the conductive shield for the injection plug 120.

The attachment portion 110 of the injection plug 120 is generally a male cylindrically shaped member or shaft having threads 111 for attaching a fluid transfer device, such as an injection line, to the attachment opening 112. Although the threads are the preferred structure by which the fluid transfer device may be attached to the attachment opening 112, other attachment means are contemplated. For example, the attachment means may be a snap-fit connector, an interference fit connector, a clamping device, latch connector, clasp device, or other device by which a fluid transfer device may be connected to the attachment portion 110.

The preferred configuration coupler for electrically coupling the conductive coating 136 to the conductive surface of the electric connector (the access cavity conductive shield 55 or the body conductive external shield 52) is the coupling member 128, which is a snap-fit or latching ring type coupler well known in the art.

As shown in FIGS. 4 and 5, the exposure portion 121 of the injection plug 120 preferably includes a stress cone 140 for minimizing corona or other electrical discharges. The stress cone 140 is generally located adjacent the attachment opening 112 because this is the area where corona discharges are most likely to occur, although the stress cone could be positioned elsewhere along the exposure portion 121. The stress cone 110 includes a curved conical surface 144 defined by diameter gradually increasing towards the attachment opening 112. This changing diameter is located on an axis of a portion of the continuous internal channel 115 in the exposure portion 121. That is, if the attachment opening 112 faces vertically upward, the stress cone 140 is shaped like an upside-down bell. The stress cone 140 also includes a cylindrical surface 142 adjacent the curved conical surface 142, and a flat surface circular surface 146 located opposite from the curved conical surface 144 such that the interior of the stress cone is a solid dielectric material. The stress cone 140 may not have a solid interior, and still be within the confines of the present invention. For instance, the stress cone 140 may have a hollow interior, similar to a bell. In the embodiment illustrated in FIG. 5, the stress cone 140 is made from an insulating material and includes the surface coating 136 preferably along the conical curved surface 144, but not the cylindrical surface 142, and the flat circular surface 146.

The stress cone is shaped and coated in this manner to shape any electric field which may form near the attachment opening 112 such that the electrical stress in the air in the region surrounding the attachment opening 112 is reduced. Thus, the shape and selection of the coating of the curved surface 144 of the stress cone 140 discourages or minimizes the occurrence of electrical discharges. Although the shape of the surface 144 is conical and curved, other shapes are contemplated. For example, the surface 144 may be conical or triangular. Other methods of reducing the electrical stress are contemplated, including the use of high dielectric constant materials.

As illustrated in FIG. 5, the stress cone 140 may be a separate piece attached to a shaft 109 of the exposure portion 121. The stress cone 110 may be attached to the shaft 109 by any method well known in the art, such as welding, glue, adhesives, chemical bonding, an interference fit, rivets, bolts, and screws. Likewise, the present invention also contemplates that the stress cone 140 may be formed integral with the shaft 109 such that the entire body of the insert 120 is one piece. In either embodiment, the stress cone 140 is part of the exposure portion 121. However, if the stress cone 140 is formed separately, it is preferable that any conductive coating 136 on the stress cone 140 be electrically coupled with any conductive coating 136 on the shaft 109 of the exposure portion 121.

Each of the foregoing observations are results of the present invention. The above description of the preferred and alternative embodiments of the present invention must be considered as illustrative only of the principle of the invention and limitative. Indeed, it may be easily understood that numerous modifications could be made by those skilled in the art without departing from the spirit of the invention as defined in the claims below.

We claim:

1. A high voltage electrical connector comprising:
   a body portion of electrically insulative material;
   a body portion conductive external shield at least partially surrounding the body portion;
   a projection of electrically insulating material having a first end connected to the body portion and a second end extending from the body portion;
   an access cavity extending through the projection and having an opening in the second end of the projection, the access activity communicating an exterior of the electrical connector with a conductive portion of an interior of the electrical connector;
   a projection conductive external shield secured to the projection, the projection conductive external shield being permanently electrically coupled to the body portion conductive external shield and extending from the body portion conductive external shield at least to the second end of the projection; and
   an insert having a body made from an insulative material, the body comprising:
      an insertion portion received by the access cavity, and
      an exposure portion, the exposure portion including
         an exterior surface,
         a conductive coating fixedly secured to the exterior portion and electrically coupled to the conductive external shield.

2. The high voltage connector of claim 1, wherein the access cavity has a length sufficient to substantially prevent current flow from the conductive portion of the interior of the electrical connector through the access cavity.

3. The high voltage electrical connector of claim 1, wherein the insertion portion of the insert includes a shaft sized to be matingly received by the access cavity of the electrical connector.

4. The high voltage electrical connector of claim 1, wherein:
   the exposure portion of the body of the insert further comprises an attachment portion, and
   the exposure portion, the insertion portion, and the attachment portion include a continuous internal channel through which a fluid may travel, the attachment portion having an attachment opening to the channel and the insertion portion having an access opening to the channel.

5. The high voltage electrical connector of claim 4, wherein the exposure portion further comprises a stress cone for preventing electrical discharges.

6. The high voltage electrical connector of claim 5, wherein the stress cone includes an outer surface, the outer surface including a curved conical surface defined by a diameter gradually increasing towards the attachment opening.

7. The high voltage electrical connector of claim 6, wherein a center of the diameter is located on an axis of a portion of the continuous internal channel in the exposure portion.

8. The high voltage electrical connector of claim 6, wherein the stress cone further includes a cylindrical surface adjacent the curved conical surface and a flat surface located opposite from the curved conical surface of the stress cone.

9. The high voltage electrical connector of claim 4, wherein the attachment portion includes means for attaching a fluid transfer device to the attachment opening.

10. The high voltage electrical connector of claim 9, wherein the attaching means is located between the attachment opening and the stress cone.

11. The high voltage electrical connector of claim 9, wherein the attaching means comprise threads on a male member extending from the exposure portion.

12. The high voltage electrical connector of claim 4, further comprising a stress cone having means for minimizing the occurrence of electrical discharges.

13. The high voltage electrical connector of claim 12, wherein the means for minimizing the occurrence of electrical discharges includes a bell-shaped outer surface of the stress cone.

14. The high voltage electrical connector of claim 4, wherein the insertion portion includes a shaft in which the internal channel is located.

15. The high voltage electrical connector of claim 14, further comprising a stress cone attached to the shaft, the stress cone having a conductive coating fixedly adhered to an exterior surface of the stress cone.

16. The high voltage electrical connector of claim 15, wherein the stress cone is made from an insulative material.

17. The high voltage electrical connector of claim 1, wherein the exposure portion further comprises a radial lip coated with the conductive coating to electrically couple the conductive coating to the conductive external shield.

18. The high voltage electrical connector of claim 1, further comprising a hole located through the exposure portion for use in removing the insert from the cavity.

19. The high voltage electrical connector of claim 1, wherein the conductive coating is on an entire surface area of the exterior surface of the exposure portion.

20. The high voltage electrical connector of claim 1, wherein the conductive coating is a conductive paint sprayed on the exterior surface of the exposure portion.

21. The high voltage electrical connector of claim 1, wherein the conductive coating is fixedly adhered to a portion of the exterior surface of the exposure portion.

22. A high voltage electrical connector comprising:
   a body portion of a electrically insulative material;
   a body portion conductive external shield at least partially surrounding the body portion;
   a projection of electrically insulating material having a first end connceted to the body portion and a second end extending from the body portion;
   an access cavity extending through the projection and having an opening in the second end of the projection, the access activity communicating an exterior of the electrical connector with a conductive portion of an interior of the electrical connector;
   a projection conductive external shield secured to the projection, the projection conductive external shield being permanently electrically coupled to the body portion conductive external shield and extending from the body portion conductive external shield at least to the second end of the projection; and
   a dielectric injection plug comprising:
      a body made from an insulative material, the body having an insertion portion and an exposure portion, the exposure portion having an attachment portion, the insertion portion including a shaft, the exposure portion including an exterior surface, a grasping portion, a conductive shield covering the exterior surface of the exposure portion, and an electrical coupling member for electrically coupling the conductive coating with a conductive surface, the exposure portion, the insertion portion, and the attachment portion inducing a continuous internal channel through which a fluid may travel, the attachment portion having an attachment opening to the channel.

23. The high voltage electrical connector of claim 22, wherein the exposure portion further comprises a stress cone for preventing electrical discharges.

24. The high voltage electrical connector of claim 21, further comprising a stress cone attached to the exposure portion.

25. The high voltage electrical connector of claim 24, wherein the stress cone includes an exterior surface at least partially covered with a conductive coating.

26. The high voltage electrical connector of claim 21, wherein the exposure portion further comprises a bell-shaped stress cone.

27. The high voltage electrical connector of claim 21, wherein the conductive shield comprises a conductive coating fixedly adhered to the exterior surface of the exposure portion.

28. The high voltage electrical connector of claim 21, wherein the conductive shield is a molded conductive elastomer.

29. The high voltage electrical connector of claim 21, wherein the conductive shield covers all surfaces of the exterior portion, excluding the attachment portion.

* * * * *

UNITED STATES PATENT AND TRADEMARK OFFICE
CERTIFICATE OF CORRECTION

PATENT NO. : 6,332,785 B1
DATED : December 25, 2001
INVENTOR(S) : Muench, Jr. et al.

It is certified that error appears in the above-identified patent and that said Letters Patent is hereby corrected as shown below:

Title page,
Item [56], References Cited, U.S. PATENT DOCUMENTS, add:
-- 4,154,993     5/1979           Kumbera --

Item [56], References Cited, FOREIGN PATENT DOCUMENTS, add:
-- 2,263,828     4/1993           U.K. --

Column 15,
Line 35, change "connceted" to -- connected --;

Column 16,
Lines 23, 29, 30, 33, 37 and 40, remove "21" and substitute therefor -- 22 --;

Signed and Sealed this

Third Day of September, 2002

*Attest:*

*Attesting Officer*

JAMES E. ROGAN
*Director of the United States Patent and Trademark Office*